(12) United States Patent
Millar, V et al.

(10) Patent No.: US 11,465,925 B1
(45) Date of Patent: Oct. 11, 2022

(54) CARBON CAPTURE METHOD AND SYSTEM

(71) Applicant: Heimdal Limited, Oxford (GB)

(72) Inventors: Erik Joughin Millar, V, Andreas (IM); Marcus Lima, Oxford (GB)

(*) Notice: Subject to any disclaimer, the term of this patent is extended or adjusted under 35 U.S.C. 154(b) by 0 days.

(21) Appl. No.: 17/575,626

(22) Filed: Jan. 13, 2022

(51) Int. Cl.
| | |
|---|---|
| *C02F 9/00* | (2006.01) |
| *C02F 1/44* | (2006.01) |
| *C02F 1/46* | (2006.01) |
| *C01B 32/60* | (2017.01) |
| *C01F 5/24* | (2006.01) |

(Continued)

(52) U.S. Cl.
CPC ............... *C02F 9/00* (2013.01); *C01B 32/60* (2017.08); *C01F 5/24* (2013.01); *H02J 7/345* (2013.01); *C02F 1/441* (2013.01); *C02F 1/4618* (2013.01); *C02F 1/5236* (2013.01); *C02F 2001/4619* (2013.01); *C02F 2101/10* (2013.01); *C02F 2103/08* (2013.01); *C02F 2201/009* (2013.01); *C02F 2201/4614* (2013.01);

(Continued)

(58) Field of Classification Search
CPC .. B01J 20/043; B01J 20/3204; B01J 20/3236; B01J 4/00; B01J 19/06; B01J 19/24; B01J 19/08; B01J 19/087; B01J 19/088; B01J 2219/0093; B01J 2219/0803; B01J 2219/0805; B01J 2219/0877; C01B 32/60; C01F 5/24; C01F 11/182; C04B 14/26; C04B 18/06; B01D 53/62; B01D 53/82; B01D 2251/304; B01D 2251/306; B01D 2251/402; B01D 2251/404; B01D 2251/606; B01D 2257/504; B01D 2259/4591; B01D 53/73; B01D 61/02; B01D 61/025; B01D 2311/2684; Y02C 20/40; C02F 1/44; C02F 1/441; C02F 1/461; C02F 1/46104; C02F 2103/08; C02F 2201/461; C02F 2201/46105; C02F 2201/4611; C02F 9/00; C02F 1/4618; C02F 1/5236; C02F 2001/4619; C02F 2101/10; C02F 2201/009; C02F 2201/46135; C02F 2201/4614; C02F 2201/46145; C02F 2201/46165; C02F 2209/40; H02J 7/345

See application file for complete search history.

(56) References Cited

U.S. PATENT DOCUMENTS

| | | | |
|---|---|---|---|
| 6,274,019 B1 * | 8/2001 | Kuwata .................... | B01J 47/08 204/632 |
| 8,999,171 B2 * | 4/2015 | Wallace ................. | B01D 61/44 210/651 |

(Continued)

FOREIGN PATENT DOCUMENTS

| | | |
|---|---|---|
| WO | 2014/006742 A1 | 1/2014 |
| WO | 2021/050496 A1 | 3/2021 |

*Primary Examiner* — Joseph W Drodge
(74) *Attorney, Agent, or Firm* — Cognition IP, P.C.; Edward Steakley

(57) ABSTRACT

Methods, systems, and apparatus, relate to a method for carbon capture from sea water. A first source of sea water into a reverse osmosis chamber. Reverse osmosis is performed on the sea water to produce fresh water and brine. The brine is provided to an electrolyzer. A current is passed through the brine and fresh water, thereby producing a hydroxide solution in a cathode chamber of the electrolyzer. The hydroxide solution is collected and placed into a contacting chamber and new sea water introduced. Precipitates are produced comprising at least calcium carbonate and magnesium carbonate.

13 Claims, 5 Drawing Sheets

(51) Int. Cl.
*H02J 7/34* (2006.01)
*C02F 103/08* (2006.01)
*C02F 1/461* (2006.01)
*C02F 101/10* (2006.01)
*C02F 1/52* (2006.01)

(52) U.S. Cl.
CPC ............ *C02F 2201/46135* (2013.01); *C02F 2201/46145* (2013.01); *C02F 2201/46165* (2013.01); *C02F 2209/40* (2013.01)

(56) References Cited

U.S. PATENT DOCUMENTS

| | | | |
|---|---|---|---|
| 2002/0158018 A1* | 10/2002 | Abramowitz | C02F 1/4618 210/639 |
| 2004/0055955 A1* | 3/2004 | Davis | C02F 1/4693 210/257.2 |
| 2009/0311342 A1* | 12/2009 | Sumita | A61Q 19/00 206/524.4 |
| 2012/0211421 A1 | 8/2012 | Self et al. | |
| 2013/0017414 A1* | 1/2013 | He | C02F 1/445 204/252 |
| 2013/0313190 A1* | 11/2013 | Levy | B01D 65/02 210/151 |
| 2013/0316196 A1* | 11/2013 | McCluskey | C02F 1/441 429/421 |
| 2014/0311897 A1* | 10/2014 | Jung | C25B 1/26 204/263 |
| 2019/0047885 A1* | 2/2019 | Nelson | C02F 1/68 |
| 2019/0193027 A1* | 6/2019 | Privitera | B01J 20/262 |
| 2021/0087697 A1* | 3/2021 | Riabtsev | C02F 1/442 |
| 2021/0094855 A1* | 4/2021 | Schmidt | C02F 9/00 |
| 2021/0254606 A1* | 8/2021 | Lowry | B01D 21/009 |
| 2021/0362094 A1* | 11/2021 | Dehlsen | B63B 1/048 |
| 2022/0040639 A1* | 2/2022 | Sant | C25B 1/26 204/263 |

\* cited by examiner

CARBON CAPTURE METHOD AND SYSTEM

CROSS-REFERENCE TO RELATED APPLICATIONS

This U.S. non-provisional application claims priority to Great Britain application number 2111575.3 filed on Aug. 12, 2021, titled Carbon Capture Method and System, which is hereby incorporated by reference in its entirety.

FIELD

The present disclosure relates to carbon capture and particularly, but not exclusively, a method of carbon capture from sea water and/or air.

BACKGROUND

Increased carbon in the earth's atmosphere and seas is a major global issue which is contributing to global climate change. Efforts are being made to reduce and reverse emission of carbon into the environment in many different ways. One such route to reducing the carbon in the atmosphere and/or sea is carbon capture. The current predominant methods for carbon capture used can be split into three categories: biological, physical and chemical.

Chemical carbon capture involves separation with solvents, separation with sorbents or separation with membranes. Separation with solvents is the absorption of carbon dioxide using an absorber solvent. One such method of chemical carbon capture is a process in which sea water is electrolysed to form chlorine gas, hydrogen gas and sodium hydroxide. The sodium hydroxide is reacted with carbon dioxide to produce sodium bicarbonate.

SUMMARY

Methods, systems, and apparatus, relate to a method for carbon capture from sea water. In some embodiments, a first source of sea water into a reverse osmosis chamber. Reverse osmosis is performed on the sea water to produce fresh water and brine. The brine is provided to an electrolyzer. A current is passed through the brine and fresh water, thereby producing a hydroxide solution in a cathode chamber of the electrolyzer. The hydroxide solution is collected and placed into a contacting chamber and new sea water introduced. Precipitates are produced comprising at least calcium carbonate and magnesium carbonate.

There is provided a carbon capture method, the method comprising: performing reverse osmosis on sea water to produce fresh water and brine in a reverse osmosis chamber; performing electrolysis with the brine in an anode chamber of an electrolyzer and fresh water from the osmosis in a cathode chamber; collecting hydroxide solution from the cathode chamber, and reacting the hydroxide solution with carbon dioxide.

In this way, sea water can be utilised for the electrolysis step, thus reducing the energy and resource cost of producing brine for the electrolysis step. Sea water also includes ions which form hydroxide solution in electrolysis. This reduces the environmental impact of the process. Further, the use of reverse osmosis produces concentrated brine which is effective in electrolysis.

The electrolyzer may comprise the anode chamber, the cathode chamber and a membrane separating the anode chamber from the cathode chamber. The membrane may be permeable to some ions and impermeable to other ions. The electrolyzer may be a cation exchange membrane cell electrolyzer. In this application, the terms cathode cell and cathode chamber are used interchangeably and the terms anode cell and anode chamber are used interchangeably.

The method may further comprise collecting depleted brine from the anode chamber, performing reverse osmosis on the depleted brine to form brine, and passing the brine back into the anode chamber. This recycling of the brine reduces the energy cost of continuing the electrolysis process Performing reverse osmosis on the depleted brine and passing the brine back into the anode chamber may comprise passing the depleted brine into the reverse osmosis chamber. In this way the depleted brine joins the sea water in the reverse osmosis chamber and utilises the same equipment as the sea water, thereby reducing the energy and resource cost of the process.

The method may further comprise dechlorinating the depleted brine before performing reverse osmosis on the depleted brine.

The method may further comprise adding hydroxide solution to the brine before the brine enters the anode chamber. The method may further comprise collecting hydroxide solution from the cathode chamber, adding a portion of the hydroxide solution to the brine before the brine enters the anode chamber. The hydroxide causes magnesium ions in the brine to precipitate out as magnesium hydroxide, which prevents magnesium ions scaling the electrolyzer, for example on the membrane. The portion of the hydroxide solution may be 10% of the hydroxide solution.

The method may further comprise adding carbonate to the brine before the brine enters the anode chamber. The carbonate causes calcium ions in the brine to precipitate out as calcium carbonate, which prevents calcium ions scaling the electrolyzer, for example on the membrane. The carbonate may be calcium carbonate.

The brine may comprise at least 30% salt.

A portion of the fresh water may be collected from reverse osmosis and cleansed to produce drinking water. This reduces environmental impact by using a by-product of reverse osmosis to produce a needed resource. The drinking water may be used on site of the carbon capture process or may be transported for use elsewhere.

The method may further comprise mixing the hydroxide solution with sea water in a sea contacting chamber, and collecting precipitates from the sea contacting chamber. The precipitates may include calcium carbonate, magnesium carbonate and magnesium hydroxide and so carbon is captured from the sea water. The precipitates may be captured by filtering the solution, for example. The precipitates such as calcium carbonate and magnesium carbonate may be collected and utilised in industries such as construction, thereby further reducing carbon emissions caused when these materials are harvested and/or produced elsewhere.

A portion of the carbonate may be added to the brine before the brine enters the anode chamber. Using the carbonate produced in the method for the precipitation of calcium in the brine utilises the resources of the method efficiently and reduces environmental impact. The portion of carbonate may be 10% of the carbonate.

The method may further comprise mixing the hydroxide solution with gas containing carbon dioxide, and collecting the carbonate and/or bicarbonate solution. Thus, carbon is captured from the gas into the solution. Gas containing carbon dioxide may be ambient air or flue gas, for example.

The method may further comprise increasing the temperature of the hydroxide solution. This may act to increase the reaction rate of the solution with carbon dioxide.

The method may further comprise adding an enzyme to the hydroxide solution before being contacted with the gas. The enzyme may be carbonic anhydrase. The enzyme may act as a pH buffer and help to catalyse the carbon dioxide conversion to bicarbonate.

The method may further comprise increasing the concentration of carbon dioxide in the gas using an air separation unit. The method may further comprise combusting the collected hydrogen in the gas containing carbon dioxide. This acts to increase the concentration of carbon dioxide. Heat from the combustion may be used to generate steam to drive a turbine for the generation of electricity. This further reduces the energy cost of the process by producing electricity. Heat from the combustion may be used to increase the temperature of the hydroxide solution.

A portion of the carbonate may be added to the brine before the brine enters the anode chamber. Using the carbonate produced in the method for the precipitation of calcium in the brine utilises the resources of the method efficiently and reduces environmental impact. The portion of carbonate may be 10% of the carbonate.

The method may further comprise distilling the carbonate and/or bicarbonate solution to produce distilled water and solid carbonate and/or bicarbonate. The bicarbonate may comprise sodium bicarbonate. Distilling may include reducing the pressure of the carbonate and/or bicarbonate solution. This avoids the need for high temperatures to evaporate the water and so avoids thermal decomposition of the bicarbonate and/or carbonate.

The distilled water may be cleaned and stored as drinking water. This reduces environmental impact by using a by-product of the carbon capture process to produce a needed resource. The drinking water may be used on site of the carbon capture process or may be transported for use elsewhere.

The gas may be effervesced through the hydroxide solution. In this way, the gas is effectively contacted with the solution with low energy requirements. This increases the effectiveness of the carbon capture and decreases energy consumption. Alternatively, the gas may be contacted with the hydroxide using a spray tower.

The method may further comprise heating the solid bicarbonate to produce carbonate and carbon dioxide, collecting the carbon dioxide. This enables capture of gaseous carbon dioxide and also reuse of the carbonate in other parts of the process, thereby enabling more carbon to be captured. Heating may use renewable energy to further reduce the environmental impact of the process.

A portion of the carbonate may be added to the brine before the brine enters the anode chamber. Using the carbonate produced in the method for the precipitation of calcium in the brine utilises the resources of the method efficiently and reduces environmental impact. The portion of carbonate may be 10% of the carbonate.

The method may further comprise contacting the carbonate with gas containing carbon dioxide to produce bicarbonate and carbon-depleted gas, collecting the bicarbonate and releasing the carbon-depleted gas. In this way, more carbon can be captured from the atmosphere, thereby improving the effectiveness of the carbon capture method.

The gas may be effervesced through the carbonate. In this way, the gas is effectively contacted with the solution with low energy requirements. This increases the effectiveness of the carbon capture and decreases energy consumption.

The method may further comprise collecting hydrogen gas from the cathode chamber and/or chlorine gas from the anode chamber. This reduces environmental impact by using a by-product of electrolysis to produce a needed resource. The hydrogen and/or chlorine may be purified, compressed, stored and/or transported.

The method may further comprise collecting nitrogen produced from the air separation unit and combining the nitrogen with the hydrogen gas collected from the cathode chamber in a Haber-Bosch process to produce ammonia.

There is further provided a method of controlling an electrolyzer in a carbon capture system, wherein the electrolyzer comprises a cathode chamber and an anode chamber, the cathode chamber containing fresh water and the anode chamber containing brine, the method comprising: varying the flow rate of the brine into the anode chamber, the change of flow rate being inversely proportional to the current supplied to the electrodes.

By varying the flow rate of brine into the anode chamber, the pressure can be controlled to avoid membrane tears due to pressure changes in the electrolyzer caused by current changes, thereby allowing electrolysis to occur effectively despite changes in current. This enables effective use of renewable energy which means that carbon is not released into the atmosphere, thereby further improving the reduction in carbon in the environment due to the carbon capture. In other words, not only does the method capture carbon from the environment, it also does not produce carbon from the energy supply for the electrolyzer.

A process time for each section of the process, for example electrolysis, carbon dioxide contact, reverse osmosis, may be proportional to the electrical current input from the renewable electricity source at that instance.

There is further provided a method of controlling an electrolyzer in a carbon capture system, wherein the electrolyzer comprises a cathode chamber and an anode chamber, the cathode chamber containing fresh water and a cathode electrode and the anode chamber containing brine and an anode electrode, the method comprising: charging a supercapacitor using a renewable energy source, when the voltage provided by the renewable energy source is inside of a target voltage range and/or a current provided by the renewable energy source is inside of a target current range, providing power to the electrolyzer from the renewable energy source, and when the voltage provided by the renewable energy source is outside of the target voltage range and/or a current provided by the renewable energy source is outside of the target current range, activating a regulator, the regulator drawing power from the supercapacitor to provide power to the electrolyzer.

In this way, the current provided to the electrodes of the electrolyzer can be kept stable, despite changes in energy provided by the renewable energy source. This method may be used instead of or as well as the method above involving varying the flow rate of brine.

Either or both methods of controlling an electrolyzer can be combined with any of the carbon capture methods described above and below.

There is further provided a carbon capture method, the method comprising: adding hydroxide solution to brine to form magnesium hydroxide precipitate, transferring the brine to an anode chamber of an electrolyzer, performing electrolysis with the brine in the anode chamber and fresh water from the osmosis in a cathode chamber, collecting hydroxide solution from the cathode chamber, and reacting the hydroxide solution with carbon dioxide.

There is further provided a carbon capture method, the method comprising: adding calcium carbonate solution to brine to form calcium carbonate precipitate, transferring the brine to an anode chamber of an electrolyzer, performing electrolysis with the brine in the anode chamber and fresh water from the osmosis in a cathode chamber, collecting hydroxide solution from the cathode chamber, and reacting the hydroxide solution with carbon dioxide.

There is further provided a carbon capture method, the method comprising: performing electrolysis with brine in an anode chamber of an electrolyzer and fresh water in a cathode chamber, collecting hydroxide solution from the cathode chamber, and effervescing gas containing carbon dioxide through the hydroxide solution.

There is further provided a carbon capture method, the method comprising: mixing sea water with hydroxide solution in a sea contacting chamber, and collecting precipitates from the sea contacting chamber. The method may further comprise releasing the sea water back into the ocean.

There is further provided a carbon capture method, the method comprising: performing electrolysis with the brine in an anode chamber of an electrolyzer and fresh water from the osmosis in a cathode chamber, collecting hydrogen gas from the cathode chamber and/or chlorine gas from the anode chamber, collecting hydroxide solution from the cathode chamber, and reacting the hydroxide solution with carbon dioxide.

This reduces environmental impact by using a by-product of electrolysis to produce a needed resource. The hydrogen and/or chlorine may be purified, compressed, stored and/or transported.

There is further provided a carbon capture method, the method comprising: providing brine, performing electrolysis with the brine in an anode chamber of an electrolyzer and fresh water from the osmosis in a cathode chamber, collecting hydroxide solution from the cathode chamber, and reacting the hydroxide solution with carbon dioxide.

The brine may have high concentration, for example, at least 25%, or at least 30% wt. The method may further comprise producing brine by combining sodium chloride with fresh water to produce high concentration brine, for example, at least 30% wt.

There is further provided a carbon capture system comprising: an electrolyzer comprising an anode chamber, a cathode chamber and a membrane separating the anode chamber and the cathode chamber, wherein the system is configured to perform a method as described above.

The system may further comprise a reverse osmosis chamber. The membrane may be permeable to some ions and impermeable to other ions. The electrolyzer may be a cation exchange membrane cell electrolyzer.

The system may further comprise a dechlorinating chamber, the dechlorinating chamber configured to dechlorinate the depleted brine before reverse osmosis is performed on depleted brine.

The system may further comprise a brine ion removal tank, configured to receive brine from the reverse osmosis chamber and to receive hydroxide and/or carbonate.

The system may further comprise a fresh water purifier configured to receive fresh water from reverse osmosis and/or a distillation chamber and clean the water to produce drinking-quality water.

The system may further comprise a sea contacting chamber configured to receive hydroxide solution from the electrolyzer and sea water, the sea contacting chamber having a precipitate-collecting mechanism.

The system may further comprise a gas contacting chamber configured to receive the hydroxide solution and gas containing carbon dioxide, the gas contacting chamber having a precipitate-collecting mechanism.

The system may further comprise an air separation unit configured to increase the concentration of carbon dioxide in the gas containing carbon dioxide.

The system may comprise a combustion chamber for combusting the collected hydrogen in the gas containing carbon dioxide. The system may further comprise a turbine configured to use heat from the combustion to generate electricity.

The system may further comprise a distillation chamber. The distillation chamber may be a vacuum distillation chamber.

The system may comprise a spray tower for contacting gas with the hydroxide solution.

The system may further comprise a heating chamber. The heating chamber may be configured to use renewable energy to heat the heating chamber.

The system may further comprise a hydrogen purifier configured to receive hydrogen gas from the cathode chamber and purify the hydrogen gas. The system may further comprise a chlorine purifier configured to receive chlorine gas from the anode chamber and purify the chlorine gas.

The system may further comprise a Haber-Bosch chamber configured to receive nitrogen from the air separation unit and receive hydrogen from the cathode chamber and combine the nitrogen with the hydrogen in a Haber-Bosch process to produce ammonia.

The system may comprise a renewable energy source configured to supply energy to the electrolyzer.

The system may further comprise a controller configured vary flow rate of brine into the anode chamber, the change of flow rate being inversely proportional to current supplied to the electrodes of the electrolyzer.

The system may further comprise a supercapacitor and a regulator, the supercapacitor configured to be charged by the renewable energy source and configured to supply energy via the regulator to the electrolyzer, wherein the regulator is configured to draw power from the supercapacitor to provide power to the electrolyzer when the voltage provided by the renewable energy source is outside of a target voltage range and/or a current provided by the renewable energy source is outside of a target current range, the regulator.

The methods and systems described above may be combined in any possible combination. The optional features described above are equally applicable to all of the described methods and systems and are not limited to the particular method/system with which they are described here. The essential features of any of the methods described may be optional features of any other method described.

Further features and advantages of the aspects of the present disclosure will become apparent from the claims and the following description.

BRIEF DESCRIPTION OF THE DRAWINGS

Embodiments of the present disclosure will now be described by way of example only, with reference to the following diagrams, in which.

DETAILED DESCRIPTION

Figure 1:
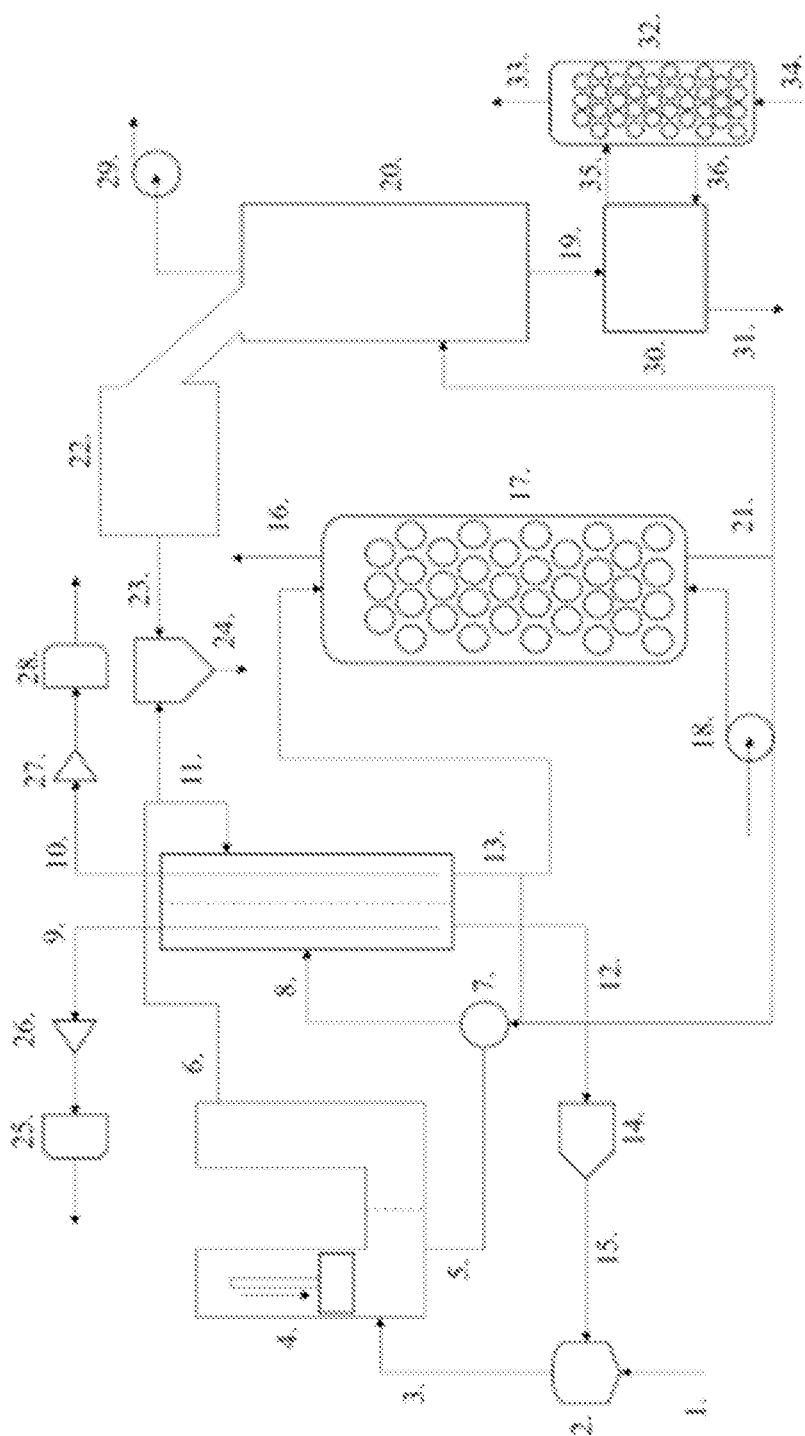
FIG. 1 illustrates a schematic diagram of an exemplary carbon capture system.

In this specification, reference is made in detail to specific embodiments of the invention. Some of the embodiments or their aspects are illustrated in the drawings.

A number of different embodiments of the disclosure are described subsequently. In order to minimise repetition, similar features of the different embodiments are numbered with a common two-digit reference numeral and are differentiated by a third digit placed before the two common digits. Such features are structured similarly, operate similarly, and/or have similar functions unless otherwise indicated. OR With reference to FIGS. ##, a further aspect of the present invention will now be described. In order to minimise repetition, similar features of the apparatus described subsequently are numbered with a common two-digit reference numeral and are differentiated by a third digit placed before the two common digits. Such features are structured similarly, operate similarly, and/or have similar functions as previously described unless otherwise indicated.

Although particular embodiments of the disclosure have been disclosed herein in detail, this has been done by way of example and for the purposes of illustration only. The aforementioned embodiments are not intended to be limiting with respect to the scope of the invention For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

FIG. 1 shows an example of a carbon capture process having four interlinking steps. It will be appreciated that there may be many variations to this process and that this diagram is simplified. The first step involves processing sea water to produce brine and fresh water. The second step involves electrolysing these products, with the brine in an anode chamber and fresh water in a cathode chamber. The third step involves capturing carbon from air using hydroxides produced during electrolysis to form bicarbonates. The fourth step is to distil the solution to collect the carbonates as precipitates.

The process in FIG. 1 includes carbon capture, desalination and chemicals production, and combines the process of sea water desalination with the production of chlorine, hydrogen, fresh water and the capture of carbon dioxide from the atmosphere using sodium hydroxide as the enabling medium.

At arrow 1, sea water is passed into a purifier 2 to remove organic impurities. The purified sea water is then fed (see arrow 3) into the reverse osmosis machine 4. The reverse osmosis machine results in the production of both fresh water (see arrow 6) and brine with 5-30 wt % ion concentration (see arrow 5).

Seawater may be obtained from the Earth's seas and oceans and other bodies of water. Sea water may contain about 47 minerals and metals, for example in the concentrations of include chloride, with a concentration of 18 980 parts per million (ppm) in seawater, sodium (10 561 ppm), magnesium (1 272 ppm), sulphur (884 ppm), calcium (400 ppm), potassium (380 ppm), bromine (65 ppm), inorganic carbon (28 ppm), strontium (13 ppm), boron (4.6 ppm), silicon (4 ppm), organic carbon (3 ppm), aluminium (1.9 ppm), fluorine (1.4 ppm), nitrogen in the form of nitrate (0.7 ppm), organic nitrogen (0.2 ppm), rubidium (0.2 ppm), lithium (0.1 ppm), phosphorous in the form of phosphate (0.1 ppm), copper (0.09 ppm), barium (0.05 ppm), iodine (also 0.05 ppm), nitrogen in the form of nitrite (also 0.05 ppm) and nitrogen in the form of ammonia (once more 0.05 ppm), arsenic (0.024 ppm), iron (0.02 ppm), organic phosphorous (0.016 ppm), zinc (0.014 ppm), manganese (0.01 ppm), lead (0.005 ppm), selenium (0.004 ppm), tin (0.003 ppm), caesium (0.002 ppm), molybdenum (also 0.002 ppm) and uranium (0.0016 ppm), gallium (0.0005 ppm), nickel (also 0.0005 ppm), thorium (also 0.0005 ppm), cerium (0.0004 ppm), vanadium (0.0003 ppm), lanthanum (also 0.0003 ppm), yttrium (also 0.0003 ppm), mercury (once more 0.0003 ppm), silver (also 0.0003 ppm), bismuth (0.0002 ppm), cobalt (0.0001 ppm) and gold (0.000008 ppm).

The reverse osmosis machine uses a partially permeable membrane for water purification through the removal of ions, unwanted molecules and larger particles. The process involves the application of pressure which is used to overcome the osmotic pressure. This uses a selective membrane preventing large molecules or ions from passing through the pores whilst allowing water to pass freely. This then results in a concentrated solution of mineral ions on one side of the membrane and fresh water on the other. The pressure may be applied utilising renewable energy.

The brine produced has ionic concentration of at least 30 wt %.

Fresh water is also produced at this stage, which is then purified ready for distribution as drinking water.

In this embodiment, sea water is concentrated to create a concentrated solution of mineral ions. However, in other embodiments, this step can be replaced by providing brine of high concentration, for example, at least 30% wt. Alternatively, this step may be replaced by combining ions (e.g. sodium chloride) with fresh water to produce high concentration brine, for example, at least 30% wt.

The next step involves the creation of hydroxides via a cation exchange membrane electrolyzer cell process using the fresh water and brine. The cation exchange membrane electrolyzer has an anode chamber and a cathode chamber separated by a membrane.

The brine is passed into the anode chamber of the electrolyzer 8 and the fresh water is split 11 between the cathode chamber of the electrolyzer 8 and drinking water purifier 24. The electrolyzer comprises an anode and cathode chamber.

On the anode side of the membrane in the membrane cell electrolyzer, the brine is passed into the chamber. During electrolysis, chloride ions oxidise and become chlorine gas. Positive ions, such as Na+ are left in solution.

On the cathode side of the membrane, fresh water is passed into the cell. Positive hydrogen ions from the water molecules are reduced by electrons, to produce hydrogen gas and hydroxide ions in solution. The positive ions in the anode chamber will be allowed to pass through the ion exchange membrane and react with the hydroxide ions in the cathode chamber to form various hydroxides (for example, sodium hydroxide, calcium hydroxide, magnesium hydroxide, potassium hydroxide). The membrane prevents any reaction between the hydroxide ions in the cathode chamber and the chlorine ions/gas in the anode chamber during the electrolysis. A potential difference between the electrodes of 3V-10V is then applied with a current ranging from 2 kA to 6 kA. Using these values will result in a current efficiency between 83-97%.

The produced hydroxide solution 13 in the cathode chamber of the electrolysis cell is passed into diffusion chamber 17.

The produced chlorine gas 9 from the anode chamber and hydrogen gas 10 from the cathode chamber are collected and purified by purifiers 26, 27 and compressed at compressors 25, 28 for storage and/or distribution. Purification of the gases can be up to 99.99% purity. The hydrogen and chlorine gases may be purified, pressurised and stored in a gaseous form or may be used in combination for the production of hydrochloric acid and PVC plastic. However, the end uses of the chlorine and hydrogen produced by the process are not limited to the applications set out here.

The electrolysis process also produces depleted brine 12 in the anode chamber which is then dechlorinated 14 and passed into the sea water purifier 15 to be purified and then reused along with the sea water.

At arrow 13, some of the hydroxide solution is passed to the brine at chamber 7, before the brine enters the electrolyzer anode chamber. This causes magnesium to precipitate out of the brine as magnesium hydroxide, thus preventing magnesium entering the electrolyzer and causing scaling on the membrane.

Some carbonate solution is also added to the brine at chamber 7, before the brine enters the electrolyzer chamber which causes calcium to precipitate out as calcium carbonate to prevent scaling on the membrane. The carbonate solution is produced in a step that will be described in more detail below. Bicarbonate is also contacted with the brine in chamber 7, before the brine enters the electrolyzer, which causes the calcium to precipitate out of solution as calcium carbonate. The bicarbonate is produced in a step that will be described in more detail below.

The flow rate of brine into the anode chamber is varied based on the current provided to the electrolyzer. The flow rate is controlled so that it is inversely proportional to the current. This can be done in real time. This enables the use of renewable electricity for the process, even if the current supplied is not constant.

The next step is the capture of carbon dioxide using a hydroxide medium in an air diffusion chamber.

Gas containing carbon dioxide is pumped 18 into the diffusion chamber 17. The gas may be ambient air collected from the atmosphere or may be flue gas, however, the process is not exclusive to these sources of carbon dioxide. The gas may be passed to the chamber using an air pump. The gas effervesces and then evolves through the hydroxide solution. The gas is typically contacted with the solution as effervescence; however, the process also accommodates other forms of carbon dioxide contacting.

Carbon dioxide reacts with the water in the solution to form carbonic acid ($H_2CO_3$). The carbonic acid donates a proton (hydrogen ion, $H+$) to form a bicarbonate ion ($HCO_3-$). The bicarbonate ion reacts with the ions in the solution to form various bicarbonates. The bicarbonates are collected at arrow 21 and the carbon depleted air is vented to the atmosphere at arrow 16. In other embodiments, the inert gas may be used for other applications.

Once the carbon has been captured in the bicarbonate solution, the next stage is to distil the solution to produce solid bicarbonate. The bicarbonate is then passed to distillation chamber 20 where water is removed from the solution through the reduction of pressure in the chamber by pump 29. The water is then condensed in condenser 22 and passed into the drinking water purifier 24. The distillation process results in the production of distilled water 23 and solid sodium bicarbonate 19.

The use of low pressure to distil the bicarbonate ensures that sodium bicarbonate does not thermally decompose during the distillation process. This is advantageous as sodium bicarbonate shows the most potential for carbon capture, but thermally decomposes at a significant rate at 358K and higher. Therefore, by keeping the temperature low and using reduced pressure for distillation, evaporation of the water can occur while not allowing the sodium bicarbonate to dissociate to carbonate. Distillation is performed with a slight increase of temperature of the solution (keeping the temperature below 358K) and the reduction of the pressure of the solution. The solid bicarbonate may then be collected and buried underground.

As an optional further step, the bicarbonate can be utilised to capture airborne $CO_2$. The solid bicarbonate 19 is passed into a heating chamber 30 where it is heated between 350K-450K to emit gaseous carbon dioxide 31 which is then stored and produce carbonate 35. The carbonate is passed to an air contacting chamber 32 where ambient air 34 evolves through the carbonate as effervescence. The chamber emits carbon depleted air 33 and the carbon dioxide in the air reacts with carbonate to form bicarbonate 36. The bicarbonate is then passed back into a heating chamber where the process is repeated.

It should also be noted that the process can be altered to run on a carbonate-based carbon capture system. The carbonate-based carbon capture system operates through carbon dioxide stripping of flue gas and/or ambient air utilising soluble carbonate to selectively react with carbon dioxide to form bicarbonate.

FIGS. 2A to 2D show a carbon capture process that involves brine production, electrolysis and sea contacting steps. The brine production and electrolysis steps are the same as in the embodiment described above.

Figure 2A:
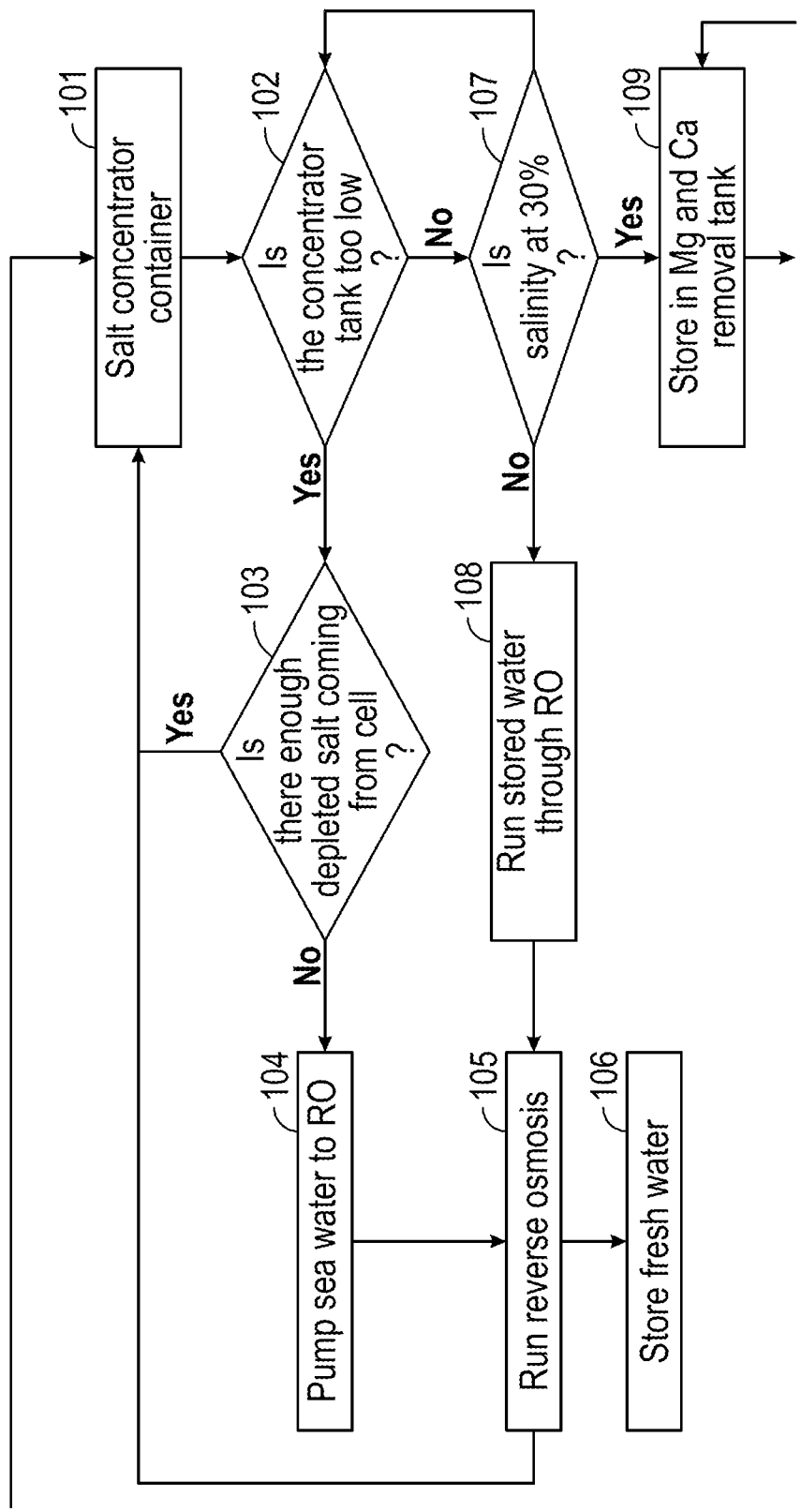
FIGS. 2A to 2D illustrates a flow chart of an exemplary carbon capture process.

FIG. 2A shows the brine production part of the carbon capture process. In other embodiments, high concentrate brine (e.g. over 30% wt brine) may be supplied and this part of the process may be omitted.

Salt water is stored in salt water concentrator container 101. At step 102, the amount of salt water in the salt water concentrator tank 101 is checked. If the amount is below a threshold, the process moves to step 103, if the amount is equal to or greater than a threshold, the process moves to step 107.

At step 103, if the amount of depleted salt water going from the electrolysis cell of the system to the salt water concentrator container is greater than or equal to a threshold, the process returns to step 102 where the level of the salt water in the salt water concentrator tank is checked again. If the amount of depleted salt water going from the electrolysis cell of the system to the salt water concentrator container is lower than a threshold, sea water is pumped to a reverse osmosis machine at step 104. Then, at step 105, the reverse osmosis is performed to produce fresh water and brine. The fresh water is stored at step 106 and the brine is stored in the salt water concentrator tank 101.

At step 107, the salinity of the salt water in the salt water concentrator container 101 is checked and if it is below 30%, the contents of the salt water concentrator container 101 are passed to the reverse osmosis machine at step 108 and reverse osmosis is run at step 105. If the salinity of the salt water in the salt water concentrator container 101 is 30% or greater, then the salt water can be passed to the brine ion removal tank at step 109.

Hydroxide and carbonates are added to the brine ion removal tank to precipitate out magnesium and calcium from the salt water. This helps to avoid scaling on the membrane of the electrolyzer.

Figure 2B:
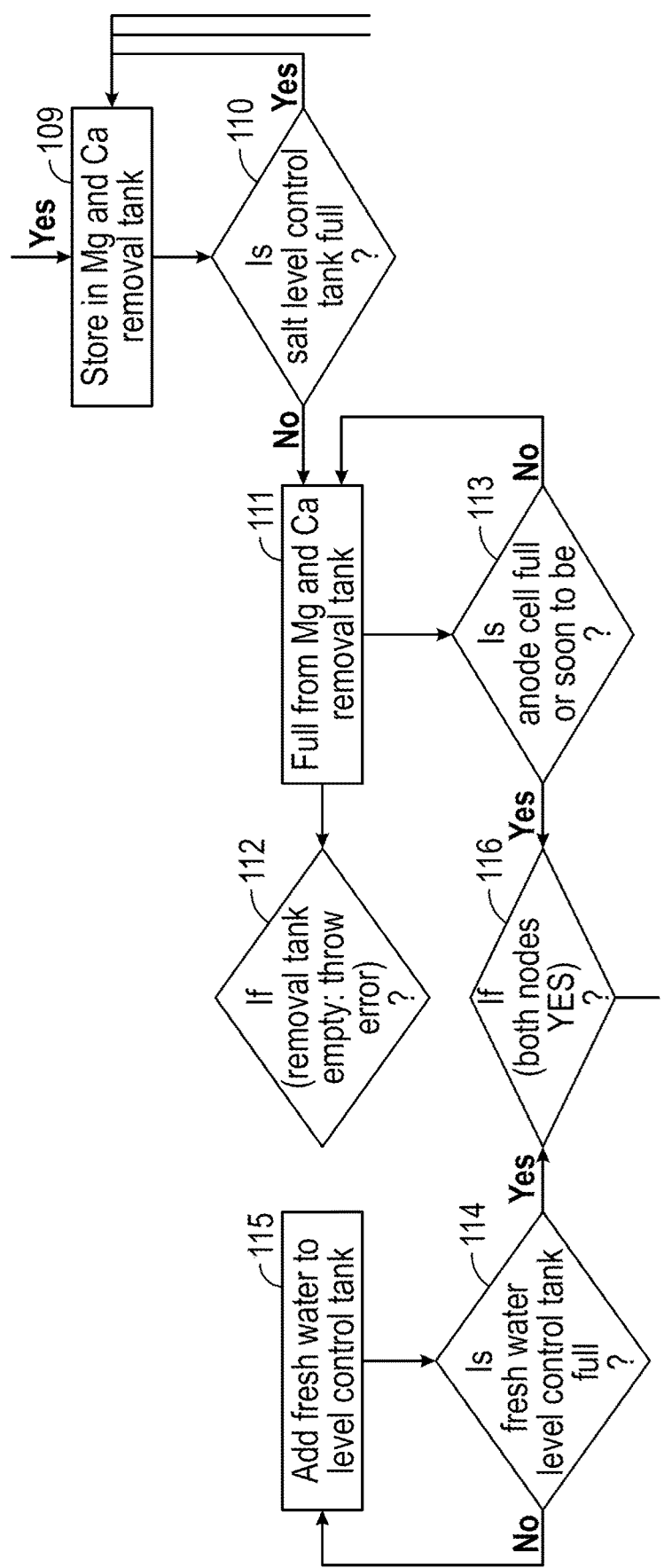

FIG. 2B shows steps taken to control the levels of fluid in the anode and cathode chambers of the electrolyzer.

The system has a salt level control tank in fluid communication with the anode chamber of the electrolyzer and a fresh water level control tank in fluid communication with the cathode chamber of the electrolyzer.

At step 110, the level of the salt level control tank is checked. If it is full, then the contents of the brine ion removal tank 109 remain in the brine ion removal tank 109. If the salt level control tank is not full, then it is filled from the brine ion removal tank in step 111. If the brine ion removal tank is empty, an error is reported at step 112. At step 113, the level of the anode cell is checked. If the anode cell is not full, then the salt level control tank is filled from the brine ion removal tank. Meanwhile, at step 114, the level of the fresh water level control tank is checked. If it is not full, it is filled with more fresh water at step 115. If the fresh water level control tank is full and the anode cell is also full at step 116, then the process moves to step 117 shown in FIG. 2C.

Figure 2C:
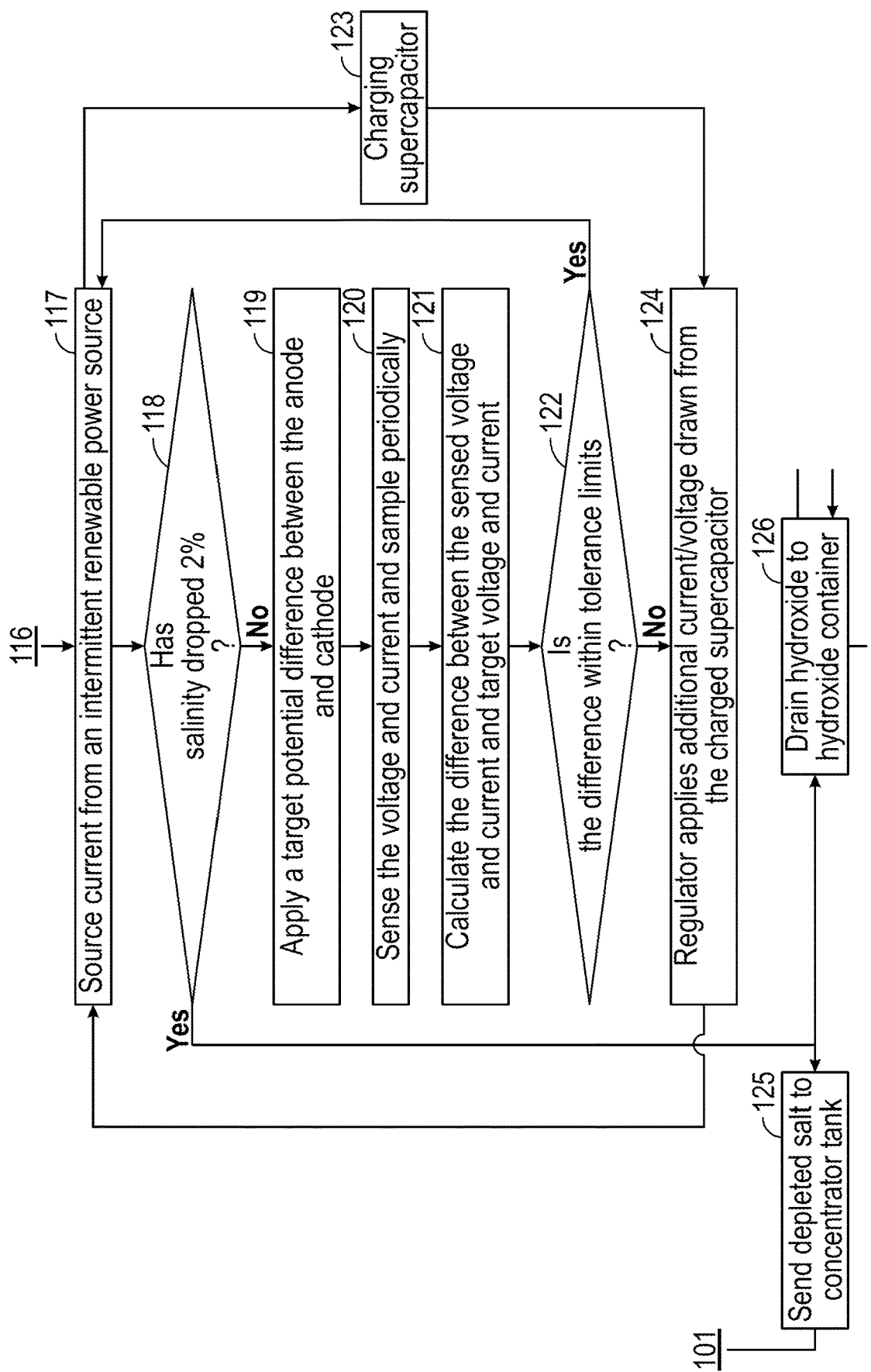

FIG. 2C shows the electrolysis part of the carbon capture process. At step 117, current is sourced from a renewable energy source.

At step 118, the salinity of the anode cell is checked. If it has dropped 2%, then in step 125, the contents of the anode cell are sent to the salt water concentrator container 101 and hydroxide in the cathode cell is drained 126 to a hydroxide container. If the salinity has not dropped by 2%, then at step 119, a potential difference is applied across the anode and cathode.

The voltage and current are sensed periodically 120. The difference between the sensed voltage and current and a target voltage and current is calculated 121. At step 122, if the difference is within a tolerance limit, then electrolysis continues by returning to step 117. If the difference is not within tolerance limits, then a regulator applies 124 additional current/voltage drawn from a charged supercapacitor. The supercapacitor is charged 123 by the renewable energy source. Electrolysis continues at step 117.

During electrolysis, hydrogen gas and chlorine gas are produced and collected for processing and further use.

Figure 2D:
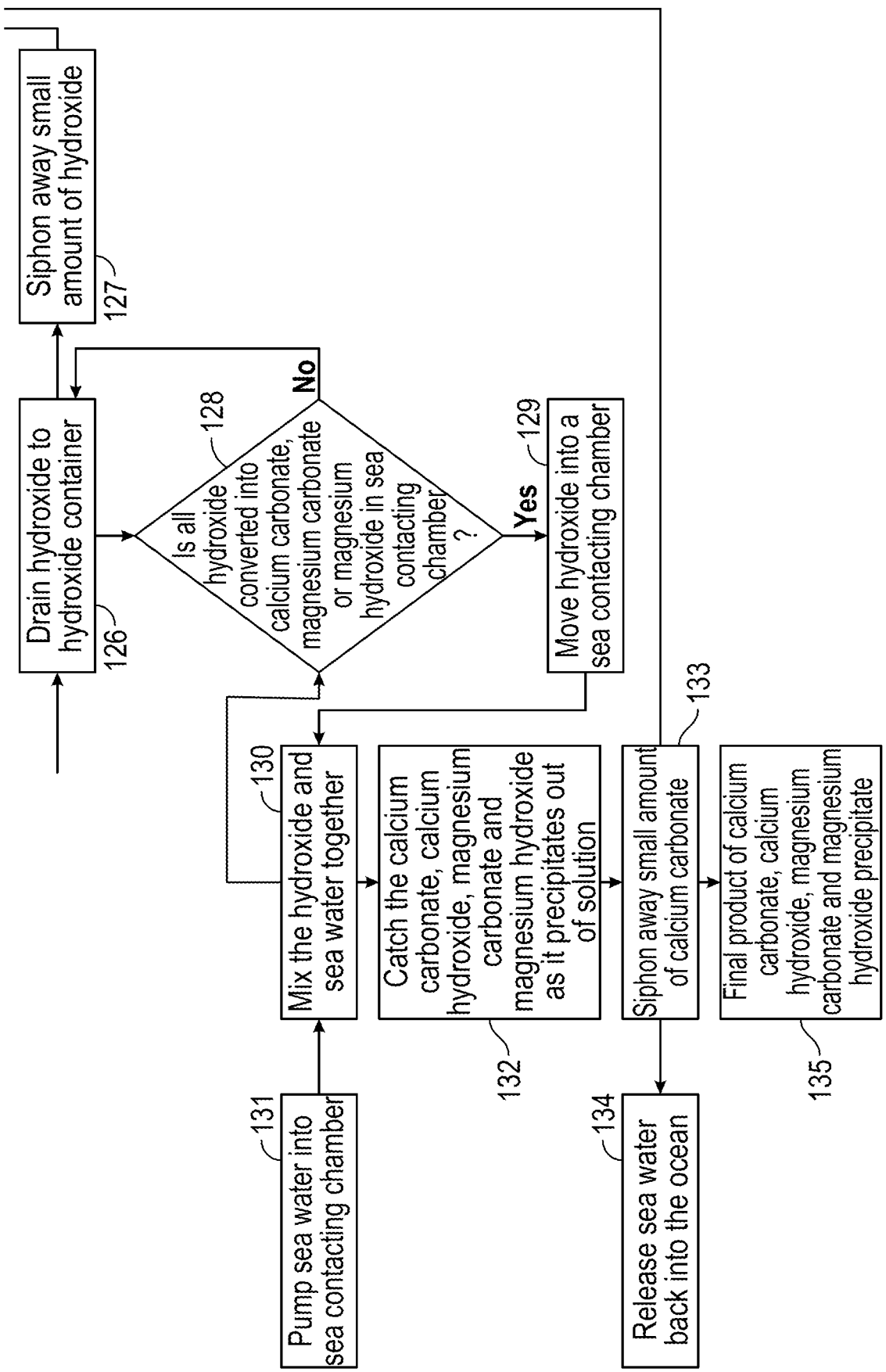

FIG. 2D shows processing of the drained hydroxide from electrolysis and a sea contacting part of the carbon capture process.

At step 127 some hydroxide is siphoned away and sent to the brine ion removal tank. There it combines with the magnesium ions to precipitate out of the salt water. This prevents the magnesium ions from scaling the membrane of the electrolyzer.

At step 131, sea water is pumped into a sea contacting chamber, where it is mixed with hydroxide from the electrolysis. The hydroxide solution reacts with carbon in the sea water to form calcium carbonate, calcium hydroxide, magnesium carbonate and/or magnesium hydroxide.

It is checked at step 128 whether all of the hydroxide in the sea contacting chamber has been converted into calcium carbonate, magnesium carbonate or magnesium hydroxide in the sea contacting chamber. If all of the hydroxide has been converted, then hydroxide from the hydroxide container is moved into the sea contacting chamber in step 129. If not all of the hydroxide has been converted, then the hydroxide from electrolysis remains in the hydroxide container.

At step 132, the calcium carbonate, magnesium carbonate or magnesium hydroxide in the sea contacting chamber precipitates out of solution. Some calcium carbonate is siphoned away and sent to the brine ion removal tank. There it combines with the calcium ions to precipitate out of the salt water. This prevents the calcium ions from scaling the membrane of the electrolyzer.

Then de-carbonated sea water is released 134 back into the ocean and the precipitates calcium carbonate, magnesium carbonate or magnesium hydroxide are collected 135.

It will be appreciated that the present disclosure may include any one and up to all of the following examples.

Example 1: A carbon capture method, the method comprising: providing a first source of sea water into a reverse osmosis chamber, the sea water comprising at least carbon dioxide, calcium and magnesium; performing reverse osmosis, via the reverse osmosis chamber, on the first source of sea water to produce a first volume of fresh water and a first volume of brine; providing the first volume of brine into an anode chamber of an electrolyzer, and providing the first volume of fresh water into a cathode chamber of the electrolyzer; performing electrolysis, via the electrolyzer by passing a current through the first volume of brine, and the first volume of fresh water, and producing a hydroxide solution in the cathode chamber; collecting the hydroxide solution from the cathode chamber into a contacting chamber; and mixing the hydroxide solution with a second source of sea water in the contacting chamber and producing precipitates comprising at least calcium carbonate and magnesium carbonate.

Example 2: The method of Example 1, further comprising: collecting the produced precipitates from the contacting chamber into a separate container.

Example 3: The method of any one of Examples 1-2, further comprising: producing in the contacting chamber an undersaturated carbon-dioxide sea water; and returning the understated carbon-dioxide sea water to a body of natural sea water.

Example 4: The method of any one of Examples 1-3, further comprising: charging a supercapacitor using a renewable energy source; providing power to the electrolyzer from the renewable energy source when a voltage provided by the renewable energy source is withing a target voltage range and/or a current provided by the renewable energy source is within a target current range; and activating a regulator, the regulator drawing power from the supercapacitor to provide power to the electrolyzer when the voltage provided by the renewable energy source is outside of the target voltage range and/or a current provided by the renewable energy source is outside of the target current range.

Example 5: The method of any one of Examples 1-4, further comprising: collecting from the anode chamber a first volume of depleted brine; performing reverse osmosis on the first volume of depleted brine to form a first volume of new brine and a second volume of fresh water; and passing the first volume of the new brine back into the anode chamber.

Example 6: The method of any one of Examples 1-5, further comprising: dechlorinating the first volume of depleted brine before performing reverse osmosis on the first volume depleted brine.

Example 7: The method of any one of Examples 1-6, further comprising: adding a portion of the hydroxide solution to the first volume of new brine before the first volume of new brine enters the anode chamber.

Example 8: The method of any one of Examples 1-7, further comprising: adding carbonate to the first volume of new brine before the first volume of new brine enters the anode chamber.

Example 9: The method of any one of Examples 1-8, wherein the first volume of brine comprises at least 25% salt.

Example 10: The method of any one of Examples 1-9, wherein a portion of the volume of fresh water is collected from reverse osmosis chamber and cleansed to produce drinking water.

Example 11. The method of any one of Examples 1-10, wherein the precipitates include a carbonate and a portion of the carbonate is added to the first volume of brine before the first volume of brine enters the anode chamber.

Example 12. The method of any one of Examples 1-11, further comprising: controlling the electrolyzer by varying flow rate of the first volume of brine into the anode chamber, wherein a change of flow rate being inversely proportional to a current supplied to electrodes of the electrolyzer.

Example 13. A carbon capture system comprising: a reverse osmosis chamber; and an electrolyzer comprising an anode chamber, a cathode chamber and a membrane separating the anode chamber and the cathode chamber, wherein the system is configured to perform a method according to any of Examples 1-12.

It is contemplated by the inventors that various substitutions, alterations, and modifications may be made to the invention without departing from the scope of the invention as defined by the claims.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A carbon capture method, the method comprising:
providing a first source of sea water into a reverse osmosis chamber, the sea water comprising at least carbon dioxide, calcium and magnesium;
performing reverse osmosis, via the reverse osmosis chamber, on the first source of sea water to produce a first volume of fresh water and a first volume of brine;
providing the first volume of brine into an anode chamber of an electrolyzer, and providing the first volume of fresh water into a cathode chamber of the electrolyzer;
performing electrolysis, via the electrolyzer, by passing a current through the first volume of brine, and the first volume of fresh water, and producing a hydroxide solution in the cathode chamber;
collecting the hydroxide solution from the cathode chamber into a contacting chamber; and
mixing the hydroxide solution with a second source of sea water in the contacting chamber and producing precipitates comprising at least calcium carbonate and magnesium carbonate.

2. The method of claim 1, further comprising:
collecting the produced precipitates from the contacting chamber into a separate container.

3. The method of claim 1, further comprising:
producing in the contacting chamber an undersaturated carbon-dioxide sea water; and
returning the undersaturated carbon-dioxide sea water to a body of natural sea water.

4. The method of claim 1, further comprising:
charging a supercapacitor using a renewable energy source;
providing power to the electrolyzer from the renewable energy source when a voltage provided by the renewable energy source is within a target voltage range and/or a current provided by the renewable energy source is within a target current range; and
activating a regulator, the regulator drawing power from the supercapacitor to provide power to the electrolyzer when the voltage provided by the renewable energy source is outside of the target voltage range and/or a current provided by the renewable energy source is outside of the target current range.

5. The method of claim 1, further comprising:
collecting from the anode chamber a first volume of depleted brine;
performing reverse osmosis on the first volume of depleted brine to form a first volume of new brine and a second volume of fresh water; and
passing the first volume of the new brine back into the anode chamber.

6. The method of claim 5, further comprising:
dechlorinating the first volume of depleted brine before performing reverse osmosis on the first volume of depleted brine.

7. The method of claim 6, the further comprising:
adding a portion of the hydroxide solution to the first volume of new brine before the first volume of new brine enters the anode chamber.

8. The method of claim 7, the further comprising:
adding carbonate to the first volume of new brine before the first volume of new brine enters the anode chamber.

9. The method of claim 1, wherein the first volume of brine comprises at least 25% salt.

10. The method of claim 1, wherein a portion of the volume of fresh water is collected from the reverse osmosis chamber and cleansed to produce drinking water.

11. The method of claim 1, wherein a portion of the precipitated calcium carbonate is added to the first volume of brine before the first volume of brine enters the anode chamber.

12. The method of claim 1, further comprising:
controlling the electrolyzer by varying flow rate of the first volume of brine into the anode chamber, wherein a change of the flow rate being inversely proportional to a current supplied to electrodes of the electrolyzer.

13. A carbon capture method, the method comprising:
providing a first source of sea water into a reverse osmosis chamber, the sea water comprising at least carbon dioxide, calcium and magnesium;
performing reverse osmosis, via the reverse osmosis chamber, on the first source of sea water to produce a first volume of fresh water and a first volume of brine;
providing the first volume of brine into an anode chamber of an electrolyzer, and providing the first volume of fresh water into a cathode chamber of the electrolyzer;
performing electrolysis, via the electrolyzer, by passing a current through the first volume of brine, and the first volume of fresh water, and producing a hydroxide solution in the cathode chamber;
producing in the contacting chamber an undersaturated carbon-dioxide sea water;
collecting the hydroxide solution from the cathode chamber into a contacting chamber;

mixing the hydroxide solution with a second source of sea water in the contacting chamber and producing precipitates comprising at least calcium carbonate and magnesium carbonate; and collecting the produced precipitates from the contacting chamber into a separate container.

\* \* \* \* \*